June 24, 1941.  E. E. BOSCA  2,247,182
SNOW SCOOTER
Filed Sept. 5, 1940   2 Sheets-Sheet 1
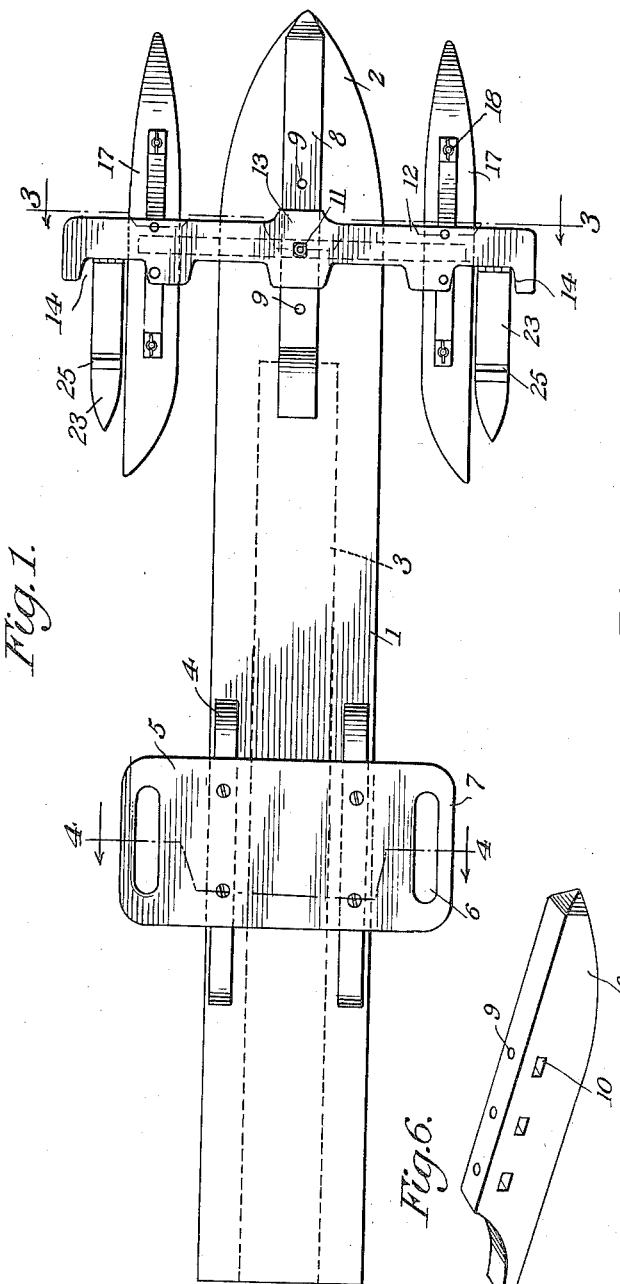
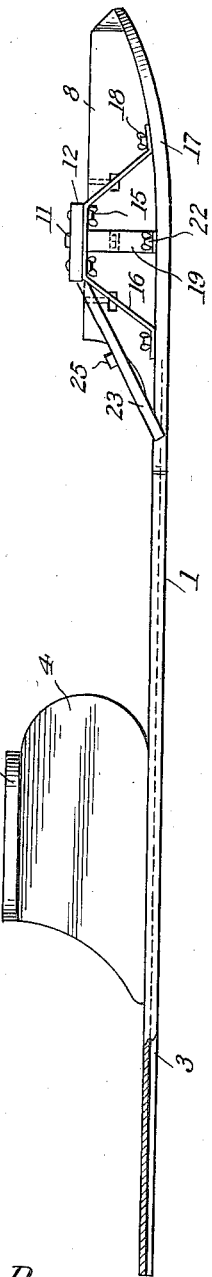
Ernest E. Bosca
INVENTOR
BY Victor J. Evans & Co.
ATTORNEYS June 24, 1941.  E. E. BOSCA  2,247,182
SNOW SCOOTER
Filed Sept. 5, 1940  2 Sheets-Sheet 2

Ernest E. Bosca
INVENTOR

BY Victor J. Evans & Co.
ATTORNEYS

Patented June 24, 1941

2,247,182

UNITED STATES PATENT OFFICE 2,247,182

SNOW SCOOTER

Ernest E. Bosca, Pasadena, Calif., assignor to May M. Bosca, Pasadena, Calif.

Application September 5, 1940, Serial No. 355,507

2 Claims. (Cl. 280—21)

This invention relates to coasting devices, and its general object is what I term a snow scooter that can be used with facility on soft or unpacked snow, and of course on hard snow and ice, as my scooter includes a single elongated relatively wide main or load supporting runner, having an upwardly curved forward end portion and broadly channeled longitudinally on its under surface, so as to prevent lateral skidding but free riding thereof upon soft snow, without materially sinking therein, as distinguished from devices of this character that are provided with narrow runners that become embedded within the snow which impedes or stops the device, with the result it will be seen that my scooter can be used and enjoyed on all snow and ice surfaces.

An important object is to provide a snow scooter that includes balancing runners or skids which tend to prevent the scooter from turning over laterally, as well as acts as steering means, in that they are disposed upon opposite sides of the main runner adjacent to the forward end thereof and are secured to a steering bar that is pivoted midway its ends.

A further object is to provide a snow scooter that includes an elevated seat, with hand gripping means therefor and the steering mechanism which includes the bar previously mentioned is operated by the feet of the rider, as well as may have foot operated braking means thereon, therefore it will be further seen that the speed and direction of travel of my scooter is under the constant control of the rider, thus making it safe to use on steep and icy hills with obstructions thereon, such as trees or the like.

Another object is to provide a snow scooter that provides greater thrills for the rider than devices of this character now in general use, and with maximum safety, and the scooter is simple in construction, inexpensive to manufacture and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view of the scooter which forms the subject matter of the present invention.

Figure 2 is a side elevation thereof with the main runner broken away and in section.

Figure 6 is a perspective view of the supporting member for the steering mechanism.

Figure 3:
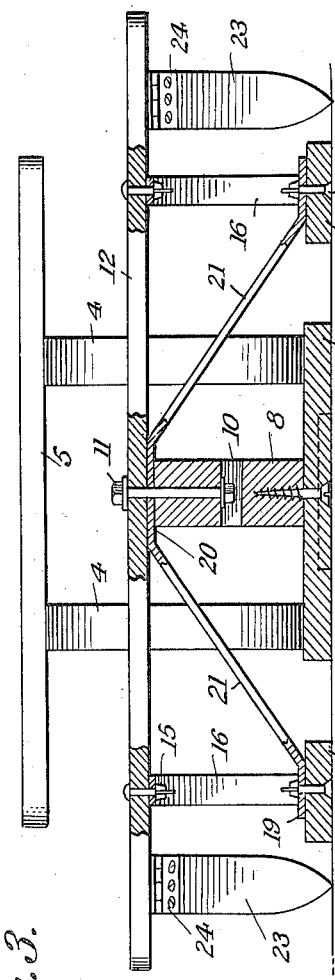
Figure 3 is a sectional view taken approximately on line 3—3 of Figure 1, looking in the direction of the arrows.
Figure 4:
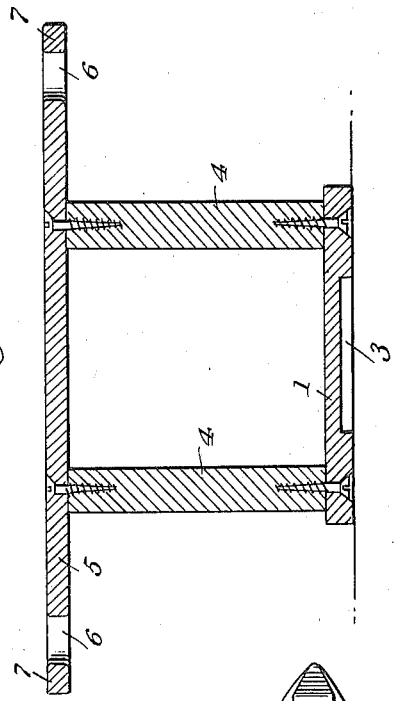
Figure 4 is a sectional view taken approximately on line 4—4 of Figure 1, looking in the direction of the arrows.

Referring to the drawings in detail, the reference numeral 1 indicates an elongated main or load carrying runner which is relatively wide and thin and may be made from any material suitable for the purpose, but in any event has an upwardly curved forward portion 2 that has its sides curved toward each other so that the front end of the forward portion terminates substantially into a point, as best shown in Figure 1. Extending along the longitudinal center of the under surface of the runner 1 from adjacent the upwardly curved portion 2 thereof to its rear end is a wide channel groove 3 which cooperates with the width of the runner 1, to tend to prevent the scooter from skidding laterally, or sinking in soft unpacked snow and thereby makes it possible to use the scooter under all snow and ice conditions.

Secured to the upper surface of the runner 1 adjacent to its sides and longitudinally thereof is a pair of flat vertically disposed supports 4 having rounded forward ends and the rear ends are reduced in curved formation from the bottom to the top of the supports as clearly shown in Figure 2. Mounted and fixed to the top of the supports 4 by screws or the like is a rectangular seat member 5 disposed in bridging relation with respect to the supports and being of a length to extend a considerable distance beyond the plane of the sides of the runner, as clearly shown in Figure 1. The seat member is slotted transversely as at 6 adjacent the ends thereof to provide hand gripping means 7, so that the rider can hold himself firmly on the seat, as will be apparent.

Secured to and rising from along the longitudinal center of the upwardly curved portion 2 and being of a length to extend from the point thereof, and beyond its rear end is an elongated support 8 having a rearwardly curved rear end and its forward end is beveled to a point, as best shown in Figure 6. The support 8 is provided for the steering mechanism which is adjustably associated therewith for application thereto at various places along its length, so that the steering mechanism can be arranged to fit riders of different heights, such as children of various ages, as well as adults, and for that purpose the support 8 is provided with a plurality of bores 9 along the length thereof and extending from its upper surface, with the lower ends of the bores communicating with slots 10 extending transversely through the support, as best shown in Figure 6, it being obvious that any one of the bores is for the purpose of receiving a pivot bolt of a bolt and nut connection 11 that has its threaded end extending into a slot for the application and removal of the nut with respect thereto, as will be apparent upon inspection of Figure 3.

The steering mechanism includes a cross bar 12 that preferably includes a wide central portion 13 to strengthen the same midway its ends and for receiving the bolt of the bolt and nut connection 11 for pivotal movement of the bar thereon. The rear edge of the bar 12 adjacent to the outer ends thereof is preferably recessed as at 14, to provide rests for the feet of the rider and secured to the under surface of the bar slightly inwardly of the recesses, preferably by wing nut and bolt connections 15 are attaching brackets 16 for the combined balancing and steering runners or skids 17.

Figure 5:
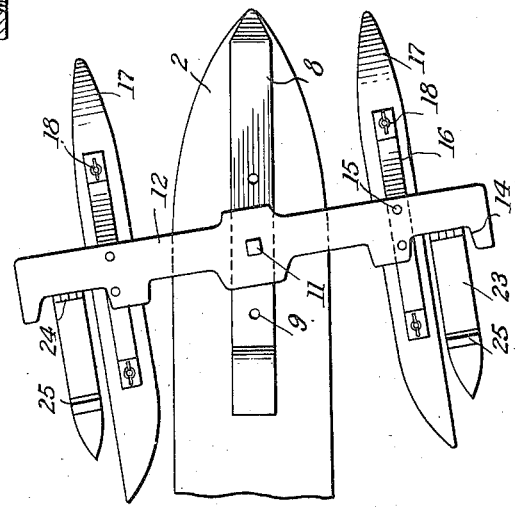
Figure 5 is a fragmentary top plan view illustrating the steering mechanism moved on its pivot for directing the scooter toward the left.

The attaching brackets 16 include horizontal upper portions providing seats for the cross bar 12 and extending from the upper portions are downwardly diverging portions that terminate in apertured ears having fixed thereto preferably by wing nut and bolt connections 18 the runners 17, as best shown in Figures 2 and 5.

I may provide a brace bracket 19 for the runners 17 especially on large size scooters, but for scooters of a size to carry one or two persons or children, the brace bracket is not necessary. In any event, the bracket includes a horizontal upper portion 20 mounted between the bar 12 and the support 8 to act as a bearing and the horizontal portion has an opening therein for receiving the pivot bolt. From the horizontal portion the bracket 19 is provided with diverging portions 21 having their outer ends secured to the runners 17 preferably by wing nut and bolt connections 22. I desire to use wing nuts as such tends to facilitate expeditious application and removal of the steering mechanism which is preferably removed for shipping and storage purposes, and the scooter can be used without the steering mechanism. In that event it can be steered by the rider shifting his weight from side to side as will be apparent. A wing nut can likewise be used with the pivot bolt, if desired.

The runners 17 may be of any suitable length and their forward portions are reduced upon opposite sides as well as curved upwardly to the same degree as the forward portion of the main runner 1, while the rear end portions of the runners 17 are shown as being curved from their inner to their outer edges, as will be noted upon inspection of Figure 1. While the under surface of the runners 16 are flat throughout their length and width, I may provide channel grooves extending longitudinally therein.

It will be noted that in the form of scooter shown, that it includes drag brakes provided with flat arms 23 having their upper ends secured to the cross bar 12 by hinges 24, to extend rearwardly from the recessed portions thereof, so that the brakes can be conveniently applied by the heels of the rider. Abutment members 25 providing heel stops are secured to the arms 23 and the lower ends of the arms are reduced to terminate into ground penetrating points, as best shown in Figure 3.

From the above description and the disclosure in the drawings, it is believed that the use of my scooter will be obvious, but it might be mentioned that the rider is seated upon the member 5 with the feet applied in the recesses 14, so that the scooter is not only conveniently steered merely by shifting the bar 12 on its pivot, but the brakes can be applied with minimum ease, merely by tilting the feet rearwardly against the arms 23. Suitable means may be provided for holding the arms 23 normally elevated against dragging, such as springs or the like.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A snow scooter comprising an elongated relatively wide main runner having an upwardly curved forward end portion terminating into a point and being grooved on its under surface along its longitudinal center from adjacent its forward portion to its rear end, seating means including a pair of supports secured to and rising from the runner adjacent the longitudinal edges thereof, a seat member secured to and bridging the upper ends of the supports and being slotted transversely thereof adjacent to its ends to provide hand gripping means, an elongated upright support secured along and rising from the longitudinal center of the forward portion of the main runner, steering means including a bar, means for pivotally connecting the bar between its ends at various places along the length of said elongated upright support for adjusting the steering means with respect to the seating means, attaching brackets secured to and depending in diverging relation from the bar, a pair of steering runners secured to the lower ends of the brackets for disposal upon opposite sides of the main runner, and bracing means between the steering runners and the bar and mounted on the pivot means of the latter.

2. A snow scooter comprising an elongated relatively wide main runner having an upwardly curved forward end portion terminating into a point and being grooved on its under surface along its longitudinal center from adjacent its forward portion to its rear end, seating means including a pair of supports secured to and rising from the runner adjacent the longitudinal edges thereof, a seat member secured to and bridging the upper ends of the supports and being slotted transversely thereof adjacent to its ends to provide hand gripping means, an elongated upright support secured along and rising from the longitudinal center of the forward portion of the main runner, steering means including a bar, means for pivotally connecting the bar between its ends at various places along the length of said elongated upright support for adjusting the steering means with respect to the seating means, attaching brackets secured to and depending in diverging relation from the bar, a pair of steering runners secured to the lower ends of the brackets for disposal upon opposite sides of the main runner, bracing means between the steering runners and the bar and mounted on the pivot means of the latter, and said bar having foot receiving rests adjacent to the ends thereof.

ERNEST E. BOSCA.